US010311554B2

(12) United States Patent
Nanu et al.

(10) Patent No.: US 10,311,554 B2
(45) Date of Patent: Jun. 4, 2019

(54) METHOD OF PROVIDING A SHARPNESS MEASURE FOR AN IMAGE

(71) Applicant: FotoNation Limited, Galway (IE)

(72) Inventors: Florin Nanu, Bucharest (RO); Adrian Bobei, Bucharest (RO); Alexandru Malaescu, Bucharest (RO); Cosmin Clapon, Bucharest (RO)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/872,873

(22) Filed: Jan. 16, 2018

(65) Prior Publication Data

US 2018/0253831 A1  Sep. 6, 2018

Related U.S. Application Data

(63) Continuation-in-part of application No. 15/446,805, filed on Mar. 1, 2017.

(51) Int. Cl.
*G06K 9/46* (2006.01)
*G06T 5/00* (2006.01)
(Continued)

(52) U.S. Cl.
CPC ............ *G06T 5/003* (2013.01); *G06T 7/0002* (2013.01); *G06T 7/13* (2017.01); *G06T 7/42* (2017.01);
(Continued)

(58) Field of Classification Search
None
See application file for complete search history.

(56) References Cited

U.S. PATENT DOCUMENTS

2005/0169531 A1* 8/2005 Fan ............................ G06T 7/12
382/199
2006/0251292 A1* 11/2006 Gokturk ............ G06F 17/30253
382/103
(Continued)

FOREIGN PATENT DOCUMENTS

WO  WO/2016/000874 A1  1/2016
WO  WO/2016/091545 A1  6/2016
WO  WO/2017/054941 A1  4/2017

OTHER PUBLICATIONS

Sang J., Lei Z., Li S.Z. (2009) Face Image Quality Evaluation for ISO/IEC Standards 19794-5 and 29794-5. In: Tistarelli M., Nixon M.S. (eds) Advances in Biometrics. ICB 2009. Lecture Notes in Computer Science, vol. 5558. Springer, Berlin, Heidelberg.*
(Continued)

*Primary Examiner* — Kim Y Vu
*Assistant Examiner* — Nathan J Bloom

(57) ABSTRACT

A method of providing a sharpness measure for an image comprises detecting an object region within an image; obtaining meta-data for the image; and scaling the chosen object region to a fixed size. A gradient map is calculated for the scaled object region and compared against a threshold determined for the image to provide a filtered gradient map of values exceeding the threshold. The threshold for the image is a function of at least: a contrast level for the detected object region, a distance to the subject and an ISO/gain used for image acquisition. A sharpness measure for the object region is determined as a function of the filtered gradient map values, the sharpness measure being proportional to the filtered gradient map values.

13 Claims, 6 Drawing Sheets

(51) Int. Cl.
*G06T 7/00* (2017.01)
*G06T 7/13* (2017.01)
*G06T 7/42* (2017.01)
*H04N 5/232* (2006.01)

(52) U.S. Cl.
CPC ..... *H04N 5/23212* (2013.01); *H04N 5/23219* (2013.01); *H04N 5/232123* (2018.08); *G06K 2009/4666* (2013.01); *G06T 2207/30168* (2013.01)

(56) References Cited

U.S. PATENT DOCUMENTS

| | | | |
|---|---|---|---|
| 2008/0019661 A1* | 1/2008 | Obrador | G11B 27/034 386/210 |
| 2008/0089561 A1* | 4/2008 | Zhang | G06F 17/30259 382/118 |
| 2010/0303363 A1* | 12/2010 | Fedorovskaya | G06K 9/00255 382/199 |
| 2014/0078320 A1* | 3/2014 | Hong | H04N 5/217 348/208.1 |
| 2014/0126804 A1* | 5/2014 | Ding | G01N 21/8806 382/141 |
| 2015/0269735 A1* | 9/2015 | Tateno | G06T 7/0046 382/153 |
| 2017/0278289 A1* | 9/2017 | Marino | G06T 11/60 |
| 2018/0041754 A1* | 2/2018 | Nanu | H04N 5/23219 |

OTHER PUBLICATIONS

Gao X., Li S.Z., Liu R., Zhang P. (2007) Standardization of Face Image Sample Quality. In: Lee SW., Li S.Z. (eds) Advances in Biometrics. ICB 2007. Lecture Notes in Computer Science, vol. 4642. Springer, Berlin, Heidelberg.*
A. Santos, et al, "Evaluation of autofocus functions in molecular cytogenetic analysis", Journal of Microscopy, vol. 188, Pt 3, Dec. 1997, pp. 264-272.
Bhattacharjee D., Prakash S., Gupta P. (2012) "No-Reference Image Quality Assessment for Facial Images" In: Huang DS., Gan Y., Gupta P., Gromiha M.M. (eds) Advanced Intelligent Computing Theories and Applications. With Aspects of Artificial Intelligence. ICIC 2011. Lecture Notes in Computer Science, vol. 6839. Springer, Berlin, Heidelberg, pp. 594-601.
Gao X., Li S.Z., Liu R., Zhang P. (2007) Standardization of Face Image Sample Quality. In: Lee SW., Li S.Z. (eds) Advances in Biometrics. ICB 2007. Lecture Notes in Computer Science, vol. 4642. Springer, Berlin, Heidelberg, pp. 242-251.
Sang J., Lei Z., Li, 52. (2009) Face Image Quality Evaluation for ISO/IEC Standards 19794-5 and 29794-5. In: Tistarelli M., Nixon M.S. (eds) Advances in Biometrics. ICB 2009. Lecture Notes in Computer Science, vol. 5558. Springer, Berlin, Heidelberg, pp. 229-238.

* cited by examiner

METHOD OF PROVIDING A SHARPNESS MEASURE FOR AN IMAGE

FIELD

The present invention relates to a method of providing a sharpness measure for an image.

BACKGROUND

A. Santos, "Evaluation of autofocus functions in molecular cytogenetic analysis", Journal of Microscopy, Vol 188, Pt 3, December 1997, pp 264-272 assesses a number of known sharpness measures. These can be classified into five main groups as follows:
A. Functions based on image differentiation such as:
 1. Threshold absolute gradient $$Sh_{th\text{-}grad} = \sum_M \sum_N |g(i, j+1) - g(i, j)|$$

while $|g(i, j+1) - g(i, j)| > thr$, where $g(i, j)$ is the gray level of pixel $(i, j)$ 2. Tenengrad function $$Sh_{tenengrad} = \sum_M \sum_N T[g(i, j)]$$

where $T[g(i,j)]$ is the square of the gradient value in pixels $(i, j)$
B. Functions based on depth of peaks and valleys
C. Functions based on image contrast
D. Functions based on histogram
E. Functions based on correlation measurements including:
  Vollath's F4 (based on the autocorrelation function, very good performance in presence of noise)

$$Sh_{VollathF4} = \sum_{i=1}^{M-1} \sum_{j=1}^{N} (g(i, j) \cdot g(i+1, j)) - \sum_{i=1}^{M-2} \sum_{j=1}^{N} (g(i, j) \cdot g(i+2, j))$$

All these functions perform pixel level computations providing an instant sharpness value for a given image or a region of interest (ROI) within an image. In order to determine a best focus position for an image or a region of interest (ROI) within an image, a focus sweep must be executed so that the focus position indicating the highest sharpness can be chosen for acquiring an image. Performing such a focus sweep including assessing each image to determine an optimal focus position can involve a significant delay which is not acceptable, especially in image acquisition devices where the ability to acquire a snap-shot or to track an object in real-time is important.

None of these techniques is able to provide an absolute sharpness value capable of indicating if a region of interest is in focus when only a single image is available, so indicating whether a change in focus position might be beneficial in order to acquire a better image of a scene.

There are also other shortcomings of at least some of the above approaches. Referring to FIG. 1, the top row shows a sequence of images of a face captured with the same face at different distances from a camera ranging from 0.33 m to 2 m. The light level for capturing the images is similar ranging from 3.5 Lux to 2.5 Lux.

Referring to the respective image/graph pairs below the top row of images, the face region from each acquired image from the top row is scaled to a common size and in this case the upper half of the face region is chosen and scaled to provide a 200×100 pixel region of interest. For each of the scenes from the top row, the focus position of the camera lens is shifted by varying a code (DAC) for the lens actuator across its range from values, in this case from 1 to >61 and a sharpness measure is calculated for each position. (Use of such DAC codes is explained in PCT Application No. PCT/EP2015/061919 (Ref: FN-396-PCT) the disclosure of which is incorporated herein by reference.) In this example, a threshold absolute gradient contrast measure such as described above is used. Contrary to human perception, the sharpness measure across the range of focus positions provided for the most distant 2 m image is actually higher than for the largest well-lit face region acquired at 0.33 m. This is because the sharpness measures for the most distant image has been affected by noise.

Referring to FIG. 2, it will also be seen that in some of the above cases, the sharpness measures for an image taken across a range of focus positions, both on focused and on defocused images, in good light (20 Lux) can be smaller than for those taken in low light (2.5 Lux), contrary to human perception, again because of the influence of noise within the image.

A different approach, which doesn't use a reference and provides a quality measure based on an eye band region is described in "No-Reference Image Quality Assessment for Facial Images" Debalina et al, pages 594-601, ICIC'11 Proceedings of the 7th International Conference on Advanced Intelligent Computing Theories and Applications. Debelina does not consider the behavior of this quality measure at various distances to a subject or in different lightning conditions. The method complexity is quite high involving k-mean clustering to separate the eyes from the skin, binary template matching based on cross-correlation to detect the eyes, Just Noticeable Blur (JNB) thresholds to compute the sharpness and this may not be suitable for a hardware implementation.

It is an object of the present invention to provide a sharpness metric which reflects human perception of the quality of a ROI within an image. The metric should be valid for varying light levels including very low light conditions where an acquired image may be quite noisy. The metric should be absolute so that a determination can be made directly from any given image whether it is sufficiently focussed or not i.e. the sharpness value for any well focused image should be higher than the sharpness level for any defocused image irrespective of an ambient luminance value.

SUMMARY

According to the invention there is provided a method of providing a sharpness measure for an image according to claim 1.

It will be noted that the sharpness measure decreases with the distance to the subject and with the ambient light level value in accordance with human perception.

The ideal absolute sharpness function should be narrow enough in all cases i.e. it should have a distinct peak around the peak focus position.

Embodiments of the invention can be used to track a ROI over a number of frames, maintaining correct focusing, even though the ROI may move within the image and be exposed with various lighting conditions.

BRIEF DESCRIPTION OF THE DRAWINGS

An embodiment of the invention will now be described, by way of example, with reference to the accompanying drawings, in which.

DESCRIPTION OF THE EMBODIMENTS

Figure 3:
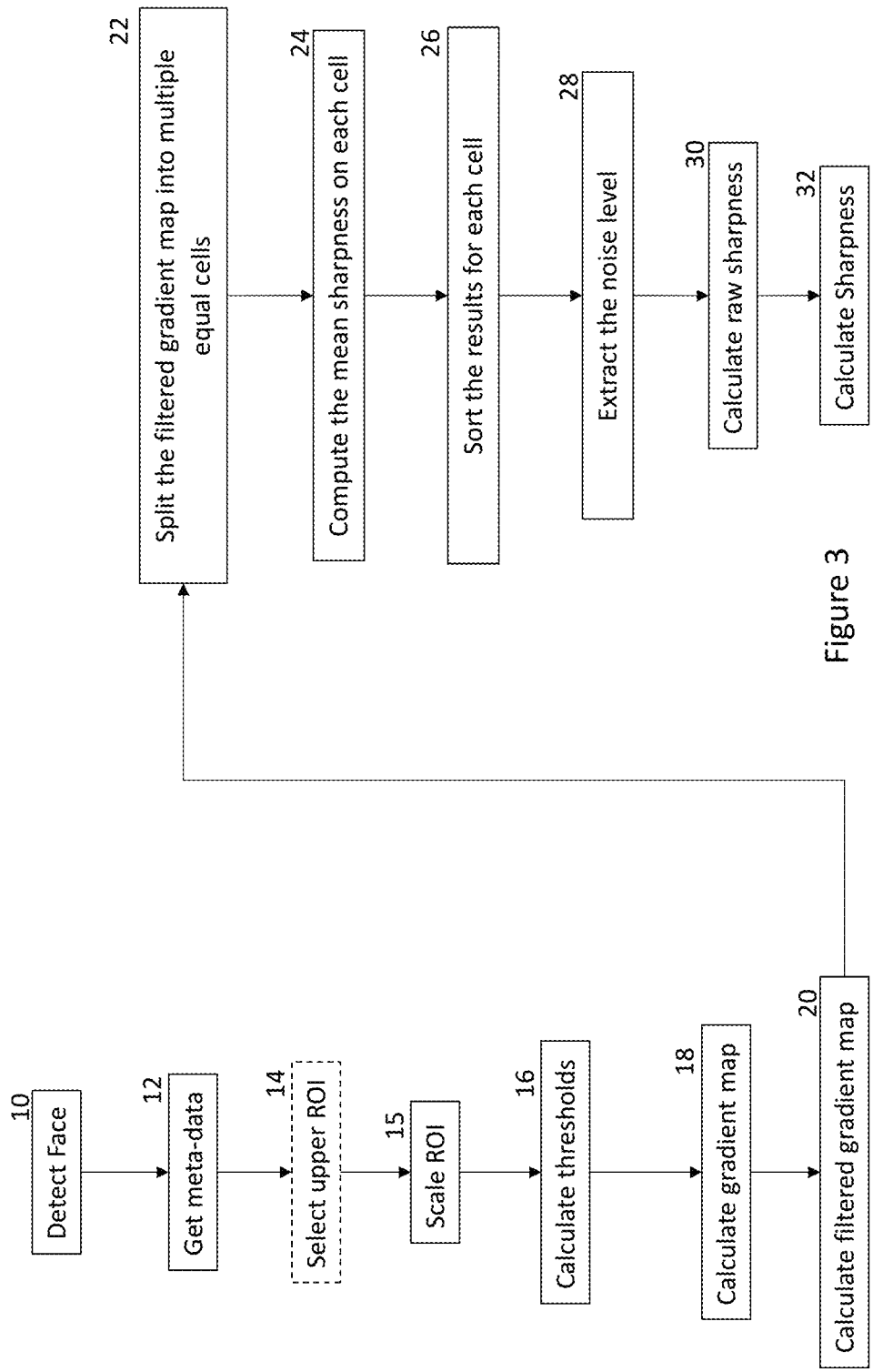
FIG. 3 is a flow diagram illustrating the calculation of a sharpness measure for a region of interest (ROI) of an image according to an embodiment of the present invention.

Referring now to FIG. 3, an embodiment of the present invention will now be described with reference to a ROI of interest of an image comprising an object comprising a face.

The method begins by first identifying a region of interest (ROI) within an image, step 10. In the present example the ROI bounds a face. It is well known to be able to identify an object such as a face within an image using a variety of techniques based on classifiers and/or neural networks such as disclosed in PCT Application No. PCT/EP2016/063446 (Ref: FN-471-PCT). In the case of a face, once identified within the image, anthrometric information can be used to assist with the method such as knowing that the distance between eyes in an adult is approximately 7 cm as disclosed in PCT/EP2015/076881 (Ref: FN-399-PCT) or that the smallest size of face which might need to be focus tracked would measure approximately 200×200 pixels.

Nonetheless, it will be appreciated that the present invention is equally applicable to providing a sharpness measure for an image with a ROI containing any type of object with a view to trying to provide an absolute sharpness value for any given image reflecting human perception.

At step 12, the method acquires the metadata for the current object/frame. This includes, for example, ISO/Gain, exposure time, object ROI coordinates, object pixel values. Other meta-data which can be used within embodiments of the invention could involve indicators of object orientation. It will be appreciated that the characteristics exhibited by an object such as a face differ according to its orientation within an image, for example, a profile image will only include 1 eye and might contain proportionally more skin than a front facing face. Similarly faces which are identified under different illumination conditions (for example, using differently trained classifiers such as: top-lit, side-lit etc.) can exhibit different characteristics. This information can be used in variations of the embodiment disclosed below, for example, to vary parameters employed in the sharpness measure. On the other hand, some parameters can be set to take into account the characteristics of features such as the eyes, skin, face pattern, face geometry/dimensions implicitly as will be explained below.

At step 14, the upper part of the face region i.e. the portion containing the eyes is chosen as the ROI on which the sharpness measure will be calculated. However, it will be appreciated that the measure could be based on the complete face region. Also, it will be clear that for inverted or portrait images, the upper part of the face may appear below or to the left/right of the lower part of the face—this is readily dealt with to ensure the portion containing the eyes is chosen.

Figure 4:
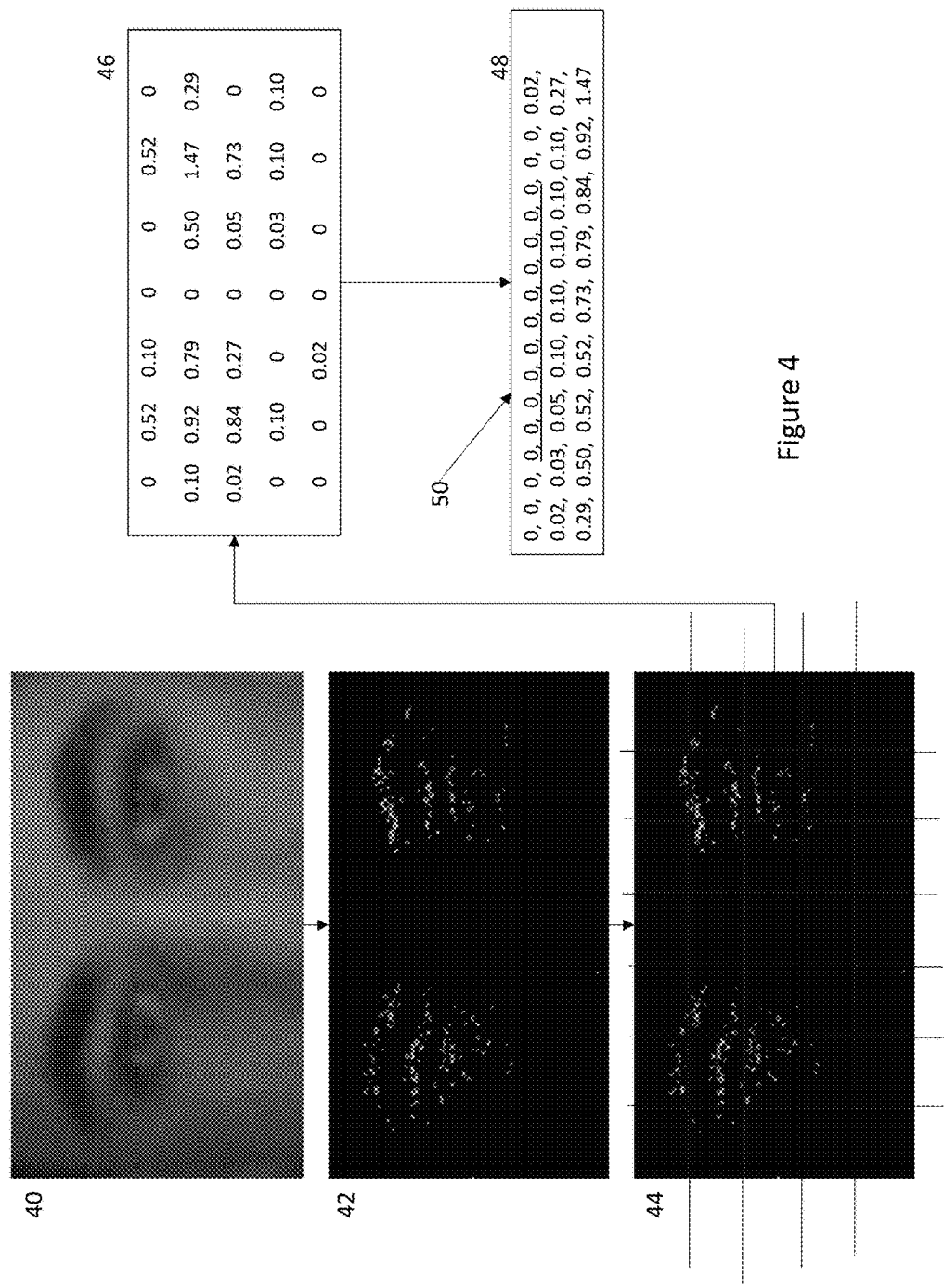
FIG. 4 shows the processing of FIG. 3 for an exemplar ROI of an image.

In the embodiment, the face size for sharpness computation is chosen as 200 (width)×100 (height) as, typically, this is the smallest face size which might be required for AF/sharpness evaluation. Thus, in step 15, the selected upper part of the face region is scaled to a size of 200×100 to provide a ROI 40 such as shown in FIG. 4.

At step 16, a series of thresholds are calculated as follows:
ISO Threshold (thr_ISO)=Meta Data ISO Value/250;
Luminance Threshold (thr_Lum)=Average luminance for pixels of the ROI/50;
Distance to subject threshold (thr_Dist)=ROI width/200;
Sharpness Threshold=max(12, thr_ISO+thr_Lum+thr_Dist).

The constants used in the ISO, Luminance and Distance threshold calculations above normalize each component of the sharpness threshold relative to one another and are based on the face size chosen for sharpness computation. As such, these can vary if a region of interest with a size different than 200×100 were chosen. Thus for a larger ROI, these constants would increase (so reducing the sharpness measure as will be seen later).

It will also be appreciated that while it is expected that an image including higher luminance values than an image with lower luminance values would be of higher quality and so its contribution to the sharpness threshold would be opposite that of ISO/gain (where increasing levels indicate poorer lighting), the present embodiment uses the average luminance value as a quick measure of the likely contrast range within an image—contrast tending to increase with increasing luminance values and so indicating higher noise levels within an image. Thus, in variants of the embodiments other measures of contrast level within the ROI could be employed than using average luminance. In this regard, it will be noted that using the ROI width as a measure of the distance to the subject involves minimal calculation and so speeds up this method.

The above sharpness threshold also assumes that optimal focus position is being determined using preview images, prior to capturing a main image. Typically, exposure time for such images is maximal and so would not vary. On the other hand, if exposure time were to be less than maximal i.e. variable, then the sharpness threshold would be proportional to the exposure time component.

At step 18, a raw sharpness (gradient) map is provided by calculating a simple difference between the luminance channel (Y) values for the scaled 200×100 ROI and a version of the scaled 200×100 ROI shifted by 1 pixel to the right. It will be seen that many different techniques can be used to provide a gradient map, for example, using a histogram of gradients (HOG) map for an image and shifting the ROI images differently relative to one another.

Now the resulting raw sharpness map is filtered by a simple thresholding where the sharpness threshold calculated at step 16 above is first subtracted from the gradient map values, step 20. Referring to FIG. 4, for a scaled ROI 40, the filtered sharpness map might look like the map 42.

This method now takes advantage of the fact that an important percentage of the ROI contains relatively uniform skin regions, where the sharpness is expected to be low.

Thus in step 22, the filtered gradient map is split into an array of generally equal sized cells. In the example of FIG. 4, an array of 7×5 cells is employed.

The mean sharpness of each cell is calculated as the average of the filtered gradient map values in each cell 24. Sample values for the ROI, map and array 40-44 are shown in the array 46 of FIG. 4.

These values are next sorted in order of magnitude, step 26, as shown in the list 48.

At step 28, the values 50 for index [3] to index [13] within the ordered list 48 are selected and their average is chosen as an indicator of the noise level within the ROI 40. Thus, in the present example, where the skin pixels are smooth rather than noisy, a noise level of 0 is determined for the ROI 40.

At step 30, a raw sharpness measure is calculated as the mean value of the filtered gradient map produced in step 20 less the noise level determined at step 28. Now the raw sharpness measure can be normalized with respect to luminance by dividing the raw sharpness measure by the mean luminance for the ROI to provide a final sharpness value, step 32.

It has been found that the above method is robust to face rotation and partial face obtrusion (by hair, glasses) particularly as the noise level computation for the ROI is determined based on a reduced sorted vector.

Figure 1:
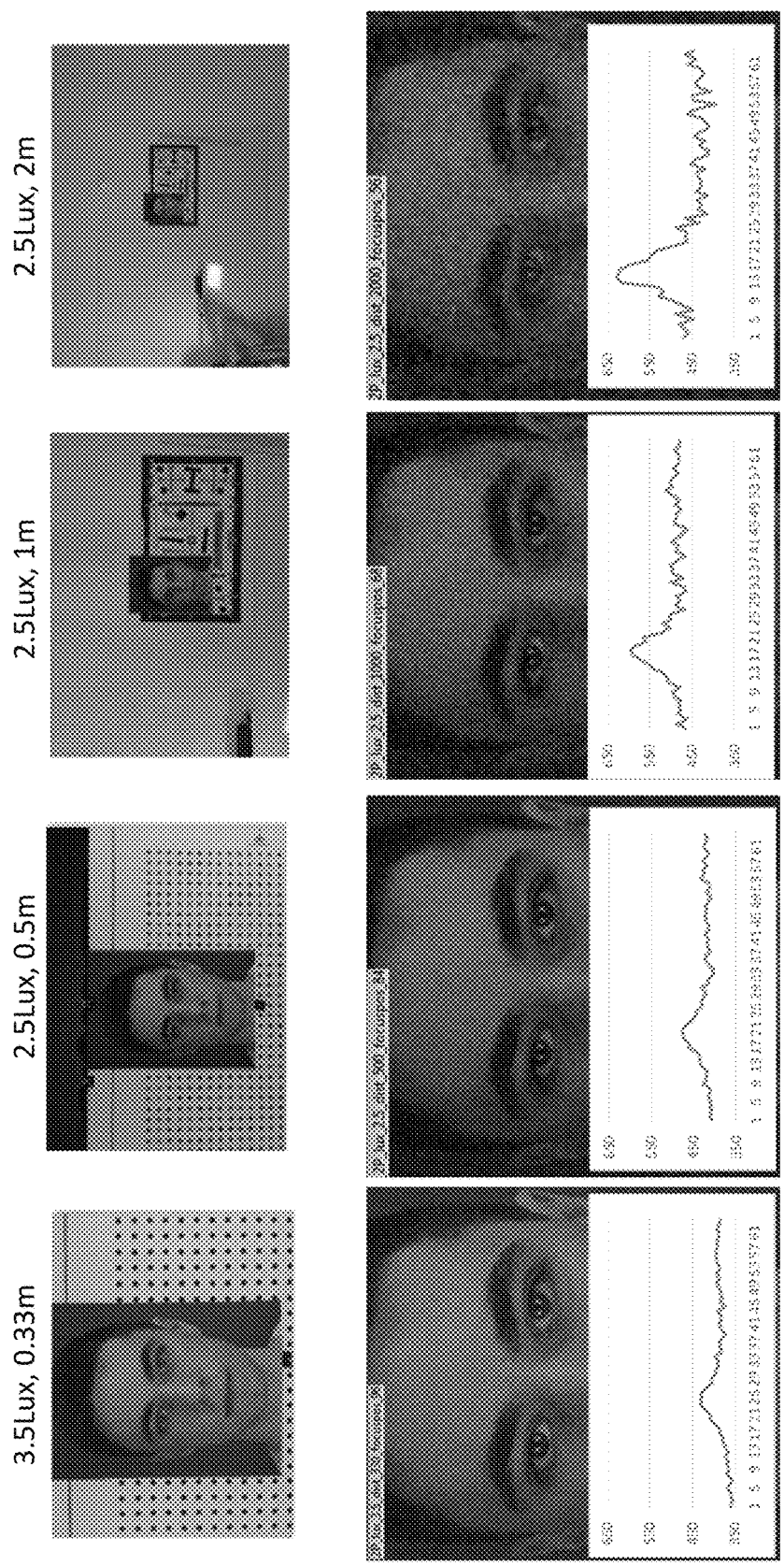
FIG. 1 shows a number of images including a face region acquired at different distances from a camera along with conventional type sharpness measures for each image.
Figure 5:
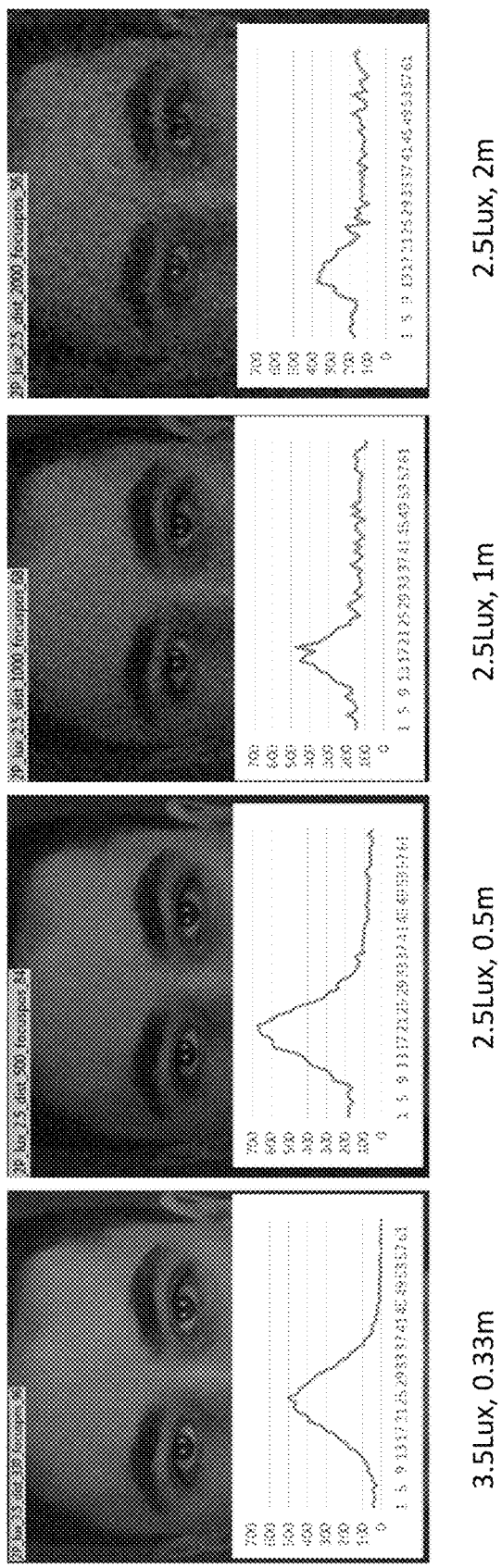
FIG. 5 shows a number of face regions from images acquired at different distances from a camera along with sharpness measures for each image provided according to an embodiment of the present invention.

FIG. 5 illustrates the sharpness measure calculated according to the above embodiment for the faces shown in FIG. 1 i.e. the same face, taken in almost same ambient conditions where only the distance to the subject is varying. As can be seen, at 2 m the absolute sharpness values are smaller than at 0.33 m, similar to the human perception.

Figure 2:
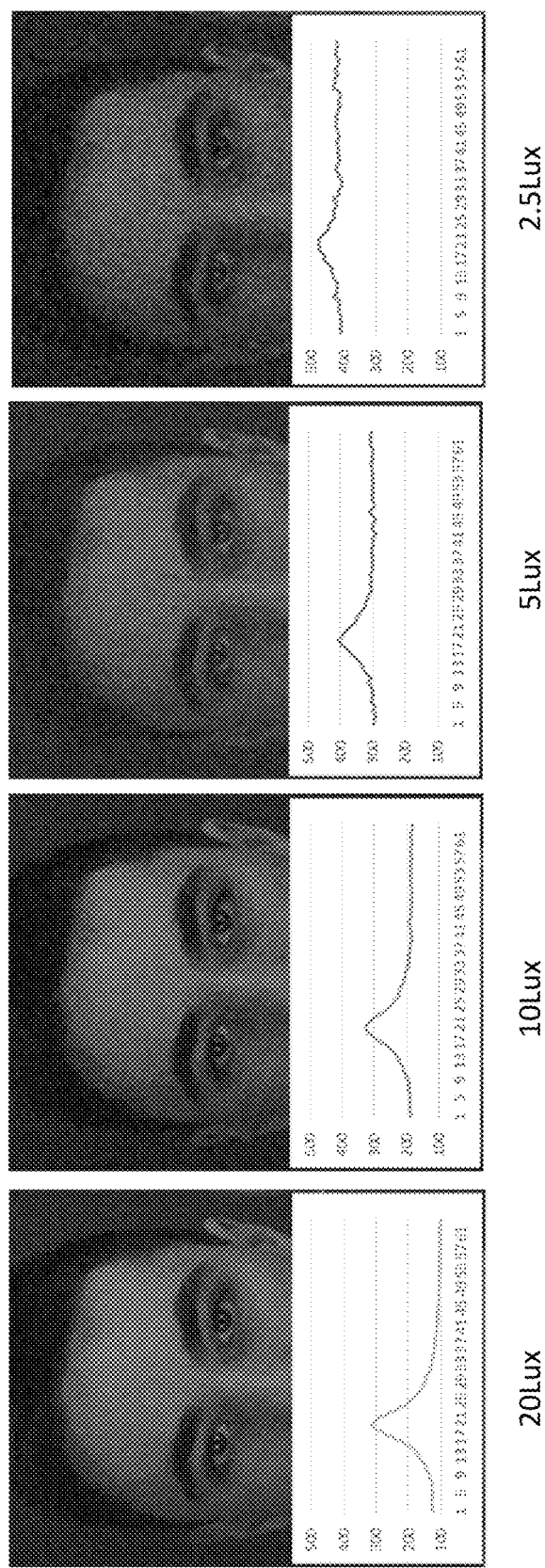
FIG. 2 shows a number of images acquired at the same distance but at different light levels along with conventional type sharpness measures for each image.
Figure 6:
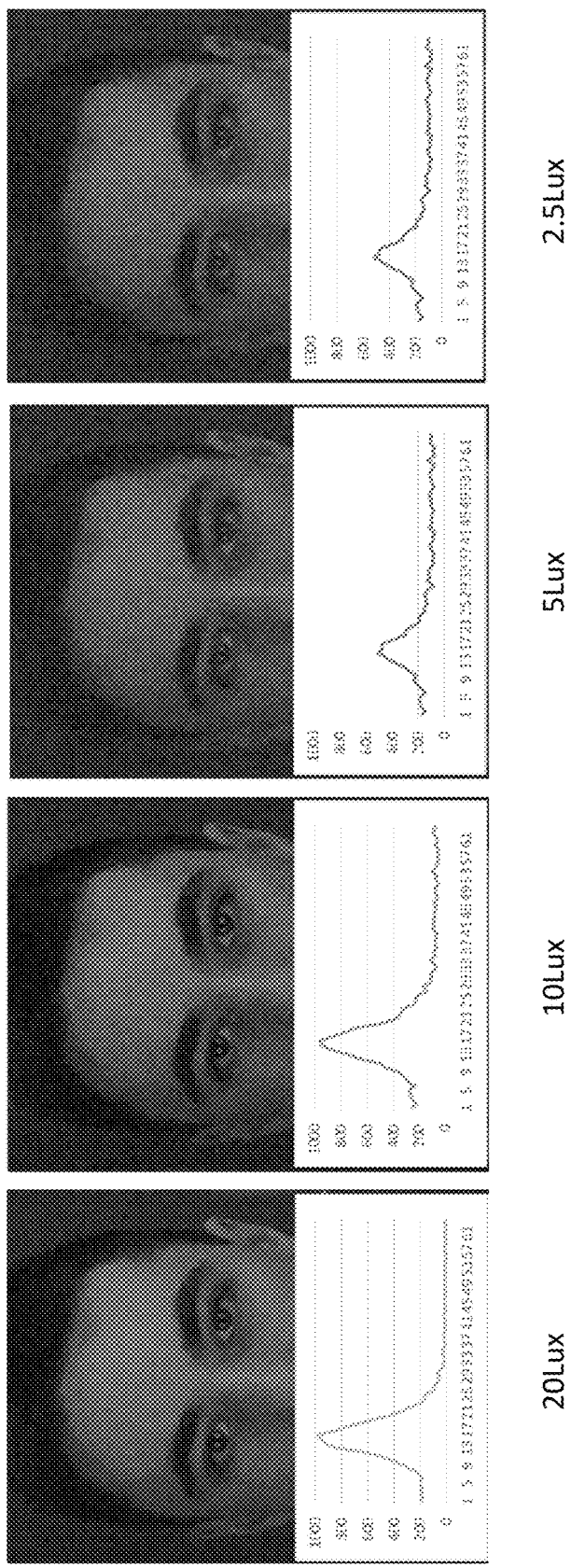
FIG. 6 shows a number of face regions from images acquired at different light levels along with sharpness measures for each image across a range of focus positions provided according to an embodiment of the present invention.

FIG. 6 illustrates the sharpness measure calculated according to the above embodiment for the faces shown in FIG. 2 i.e. on faces at same distance at various ambient light levels. As will be seen, for good light, the sharpness measure is bigger than for images acquired in in low light, again similar to the human perception, and with a well-defined peak.

The sharpness value for the focused images is higher than the sharpness values of the defocused images even when we compare the curves taken in different lighting conditions. This is again similar to the human perception.

A second embodiment can improve the quality (from a human perception point of view) of the sharpness measure of the above described first embodiment for images of subjects at shorter distances (e.g. 300 mm-500 mm). Compared to images of subjects at longer distances (>1000 mm), a larger quantity of light lands on the image sensor for images of subjects at shorter distances. Thus, a wider range of lens positions tends to output similar sharpness levels, when the lens is near a desired shorter focus position.

However, with more information in such images, stronger filtering can be done and thus the focus position can be determined for such images more accurately i.e. the sharpness curve slope should increase and provide a clearer peak value.

In the previous embodiment, the image is split in 7×5 blocks 44 and the average illumination for each block is stored in an array 46. The array values are then sorted in ascending order and a noise level is extracted at step 28, using the $3^{rd}$ and $13^{th}$ elements of the sorted array (sorted_vals) 48.

Instead of using just these elements, the second embodiment takes into account all of the elements from the sorted array 48 and splits them into two categories:

First 30 elements, from $1^{st}$ to $30^{th}$ (lowest values)—comprise residual information with a higher probability of containing noise and a lower probability of containing useful information (e.g. eyes)

Last 6 elements, from $30^{th}$ to $35^{th}$ (highest values)—comprise useful information with a higher probability of containing information from the eye and eyebrow regions and with a lower probability for noise.

Using the same thresholds (thr_Dist, average luminance) as in the first embodiment, together with the ISO value, two weights corresponding to the useful information ($w_b$) and the residual information ($w_r$) are computed as follows:

$$w_b=0.1*(\text{thr\_Dist}-(\text{ISO Value/Average luminance})*0.01);$$

$$w_r=1-w_b;$$

Thus, extracting the noise level at step 28 of the first embodiment is replaced with extracting a face threshold parameter (thr_Face) by assigning the above mentioned weights in the form of a weighted average as follows:

$$\text{thr\_Face}=\text{mean}(\text{sorted\_vals}(30:35))*w_b+\text{mean}(\text{sorted\_vals}(1:30))*w_r;$$

with the initial sharpness threshold of the first embodiment being adjusted as follows:

$$\text{sharpness\_thr}=\min([\text{MAX\_SHARPNESS\_TH},(\max(12,\text{thr\_ISO}+\text{thr\_Lum}+\text{thr\_Dist})+\min(10,\text{thr\_Face}*20))]);$$

where MAX_SHARPNESS_TH is a constant=20.

Numerically, this allows for a stronger filtering at small distances, lowering the sharpness values for the blurred pictures and generating a better determined peak value.

In step 30 of the first embodiment, a raw sharpness value is computed by subtracting the noise level from the mean of the filtered gradient map produced in step 20 in order to filter the residual information from the image, for example, as follows:

$$\text{raw\_sharpness}=\max(0,(\text{mean filtered gradient map}-\text{noise\_level})*1000)$$

In contrast, in the second embodiment, thr_Face replaces the noise level in the above formula, for example, as follows:

$$\text{raw\_sharpness}=\max(0,(\text{mean filtered gradient map}+\text{thr\_Face})*1000).$$

The reason is that the face threshold quantifies the useful information and provides for improved sharpness discrimination at different distances. Note that for each of the above steps further constants may be employed within the calculations described in order to scale the intermediate values and indeed the final sharpness value as required.

Indeed these and the other values described above can be varied from one image device to another to take into account different scales of values used across different devices.

While the above described embodiments produce a useful absolute sharpness value across a range of image acquisition conditions, it will be seen that there can come a point where the image is so noisy that the measure may not be reliable. Thus further variants of the above described embodiments can take this into account and flag that providing a measure is not possible or that the measure is not reliable.

The invention claimed is:

1. An image processing device arranged to, and comprising the steps of:
   detect an object region within an acquired image;
   obtain meta-data for the acquired image;
   scale the chosen object region to a fixed size;
   calculate a gradient map for the scaled object region;
   compare the gradient map against a threshold, wherein the threshold for the acquired image is a function of at least: a contrast level for the detected object region, a distance to the subject and an ISO value used for image acquisition;
   determine a sharpness measure for the object region as a function of the filtered gradient map values, the sharpness measure being proportional to the filtered gradient map values; and
   responsive to the sharpness measure indicating the object region is not sufficiently focussed, change focusing for acquirinq a subsequent image.

2. An image processing device according to claim 1 wherein the fixed size is 200×100 pixels.

3. An image processing device according to claim 1 wherein the object is a face.

4. An image processing device according to claim 3 wherein the method further arranged to crop the face region to only use a face region containing at least one eye as the chosen object region.

5. An image processing device according to claim 1 further arranged to calculate a noise measure for the object region by:
   splitting the filtered gradient map into an array;
   determining a mean sharpness for each cell of the array;
   sorting the mean sharpness values in order of magnitude;
   selecting a sub-range of sharpness values from the sorted sharpness values; and
   calculating said noise measure for the object region as a function of said sub-range of sharpness values.

6. An image processing device according to claim 5 wherein said sub-range comprises a group of the lowest valued sharpness values.

7. An image processing device according to claim 5 wherein the sharpness measure is a function of the noise measure for the object region, the sharpness measure being inversely proportional to the noise measure.

8. An image processing device according to claim 1 further arranged to calculate a threshold measure for the object region by:
   splitting the filtered gradient map into an array;
   determining a mean sharpness for each cell of the array;
   sorting the mean sharpness values in order of magnitude;
   the threshold for the object region, thr_Face, being defined as follows:

$$\text{thr\_Face} = \text{mean}(\text{sorted\_vals}(\text{high}))*w_b + \text{mean}(\text{sorted\_vals}(\text{low}))*w_r;$$

where:
sorted_vals(low) and sorted_vals(high) are groups of lowest and highest mean sharpness values respectively;

$$w_b \propto f(\text{distance to subject}) - (\text{ISO value} / \text{contrast level} * d);$$

$$w_r = 1 - w_b; \text{ and}$$

d is a constant.

9. An image processing device according to claim 8 wherein the sharpness measure is proportional to the threshold measure for the object region.

10. An image processing device according to claim 8 wherein the threshold for the acquired image is proportional to sum of thresholds for ISO, contrast and distance adjusted by said threshold for the object region, thr_Face.

11. An image processing device according to claim 1 wherein the threshold tor the acquired Image is the maximum of: a constant; and a sum of thresholds for ISO, contrast and distance.

12. An image processing device according to claim 1 wherein the threshold for the acquired image is proportional to average luminance, ISO and distance.

13. An image processing device according to claim 1 further arranged to extract meta-data from the acquired image to determine parameters for each of said ISO, contrast and distance thresholds.

* * * * *